(12) United States Patent
Kumagai et al.

(10) Patent No.: US 7,636,644 B2
(45) Date of Patent: Dec. 22, 2009

(54) ABSOLUTE ANGLE CALCULATION APPARATUS

(75) Inventors: Kaoru Kumagai, Tokyo (JP); Masahiro Saito, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 7 days.

(21) Appl. No.: 12/127,609

(22) Filed: May 27, 2008

(65) Prior Publication Data

US 2008/0300822 A1 Dec. 4, 2008

(30) Foreign Application Priority Data

May 28, 2007 (JP) ............................. 2007-140223

(51) Int. Cl.
*G01B 11/26* (2006.01)
(52) U.S. Cl. ...................................................... 702/151
(58) Field of Classification Search .................. 702/151
See application file for complete search history.

(56) References Cited

U.S. PATENT DOCUMENTS 4,786,891 A * 11/1988 Ueda et al. .................... 341/13

FOREIGN PATENT DOCUMENTS

JP 3168451 3/2001

* cited by examiner

*Primary Examiner*—Tung S Lau
(74) *Attorney, Agent, or Firm*—Dickstein Shaprio LLP (57) ABSTRACT

The absolute angle calculation apparatus includes a calculation circuit calculating an absolute angular position based on a spatially modulated component in a photoelectrically-converted signal string. The calculation circuit includes a photoelectrically-converted signal string storage storing previous and current photoelectrically-converted signal strings obtained, for interpolating the absolute angular position, within a set time shorter than an absolute angle calculation time required to calculate the absolute angular position; a correlation detection circuit detecting a correlation between the previous and current photoelectrically-converted signal strings in the photoelectrically-converted signal string storage and detecting a shift amount therebetween; and an interpolation calculation circuit interpolating an inter-pattern absolute angular position equivalent value based on the shift amount obtained by the current measurement. The calculation circuit calculates an interpolated angle based on the shift amount and the absolute angular position equivalent value, adds the calculated interpolated angle obtained at the current measurement to the absolute angular position obtained at the previous measurement to calculate a current absolute angular position.

10 Claims, 8 Drawing Sheets

ABSOLUTE ANGLE CALCULATION APPARATUS

CROSS REFERENCE TO RELATED APPLICATIONS

The present application is based on and claims priority from Japanese Patent Application Number 2007-140223, filed May 28, 2007, the disclosure of which is hereby incorporated by reference herein in its entirety.

BACKGROUND

The present invention relates to an absolute angle calculation apparatus which calculates an absolute angular position with respect to a reference angular position with a rotary encoder incorporated, for example, in a rotary laser apparatus or the like.

Figure 1:
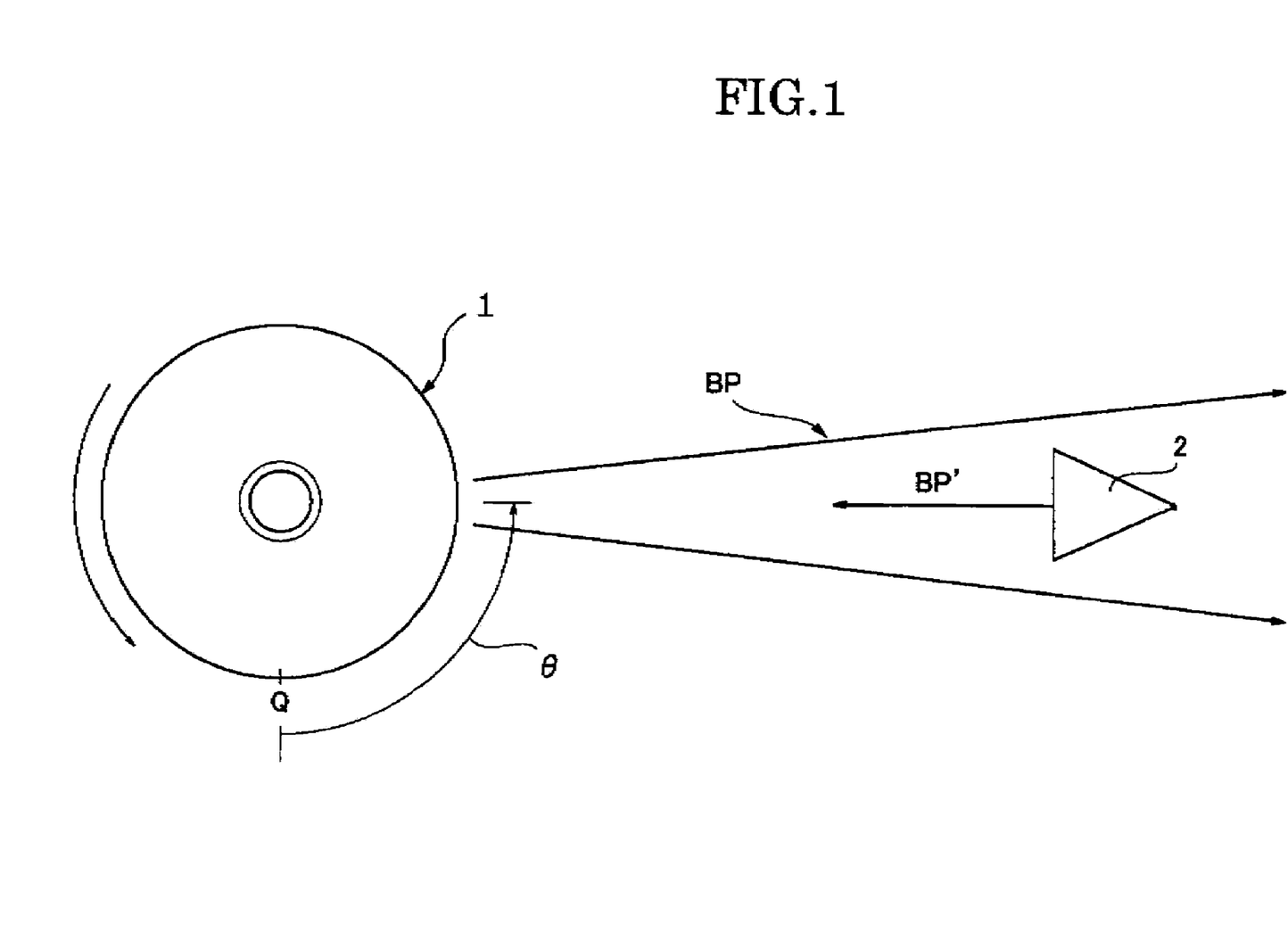
FIG. 1 is an explanatory view illustrating an example of a usage of a rotary laser apparatus.

As illustrated in FIG. 1, one of known surveying instruments such as a rotary laser apparatus 1 is configured to detect an absolute angular position θ of a target 2 with respect to a reference angular position Q of the rotary laser apparatus 1 by rotating a rotating prism (not illustrated), for example, at three revolutions per second (180 rpm), projecting a fan beam BP onto the target 2, and receiving a reflected light beam BP' from the target 2.

The rotary laser apparatus 1 subsequently projects a laser beam to the target 2, for example, at the detected absolute angular position θ, and receives the reflected light beam BP' from the target 2 to measure a distance between the rotary laser apparatus 1 and target 2.

Figure 2A:
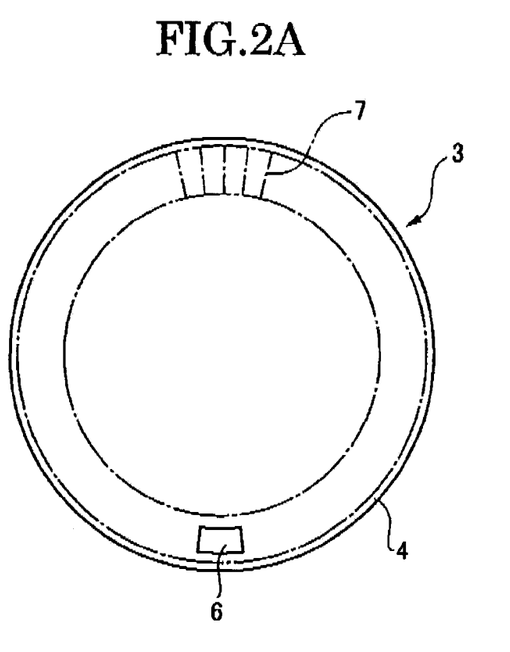
FIG. 2A being a plan view illustrating a schematic structure thereof.
Figure 2B:
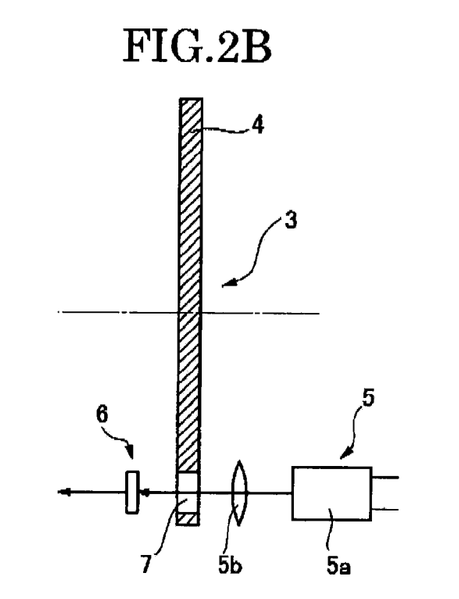
FIG. 2B being a side view illustrating the schematic structure.

The rotary laser apparatus 1 of this type internally includes a rotary encoder 3 illustrated in FIGS. 2A and 2B. The rotary encoder 3 mainly comprises a rotating plate 4, a light emitting unit 5, and a light receiving unit 6.

Figure 2C:
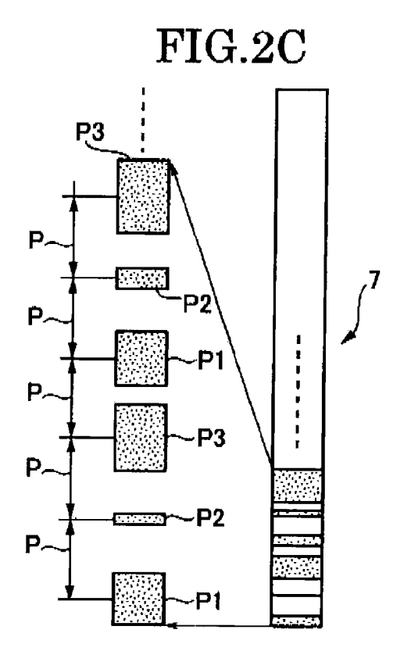
FIG. 2C being an exploded view illustrating an example of patterns of transmissive slits.

A large number of transmissive slits 7 are formed in a circumferential direction in a peripheral part of the rotating plate 4. The large number of transmissive slits 7 include, for example, first to third patterns P1 to P3 which are spatially modulated as illustrated in FIG. 2C.

For example, Japanese Patent No. 3168451 discloses that the patterns P1 to P3 are formed at a constant pitch width P. A pattern width of the pattern 1 is fixed, while the widths of the patterns P2 and P3 are modulated according to a predetermined rule.

The light emitting unit 5 and light receiving unit 6 are arranged to face a slit-formed region of the rotary plate 4 and to face each other with the rotary plate 4 interposed therebetween. The light emitting unit 5 comprises, for example, a light emitting element 5a and a collimator lens 5b, and the light receiving unit 6 comprises, for example, a linear sensor. The light receiving unit 6 receives a light beam from the light emitting unit 5 through the transmissive slits 7 and converts the light beam to a photoelectrically-converted signal string. Then, the photoelectrically-converted signal string is inputted to a calculation circuit (not illustrated).

The calculation circuit calculates the absolute angular position θ with respect to the reference angular position Q on the basis of a spatially modulated component contained in the photoelectrically-converted signal string in the light receiving unit 6.

Meanwhile, it usually takes about 100 milliseconds (ms) for the calculation circuit of this type to calculate the absolute angular position θ. On the other hand, the rotary encoder 3 of this type rotates, for example, about 108° (degrees) for 100 ms. Accordingly, there is a possibility that when a measurement is performed every 100 ms, the absolute angular position θ of the target 2 with respect to the reference angular position Q may not be precisely calculated.

Moreover, there is another possibility that in a case of a simultaneous measurement of two or more targets, if the two or more targets are within an angular position range of less than 108°, the absolute angular position of at least any one of the targets may not be measured.

SUMMARY

An object of the present invention is to provide an absolute angle calculation apparatus which is capable of reducing an angle calculation time and in addition precisely measuring the absolute angular position.

An absolute angle calculation apparatus according to the present invention comprises: a rotary plate having patterns spatially modulated; a light emitting unit facing a rotary range of the patterns; a light receiving unit which receives a light beam obtained from the light emitting unit through the patterns and converts the light beam to photoelectrically-converted signal strings; and a calculation circuit which calculates an absolute angular position with respect to a reference angular position on the basis of a spatially modulated component contained in the photoelectrically-converted signal string outputted from the light receiving unit, the calculation circuit includes: a photoelectrically-converted signal string storage which stores previous and current photoelectrically-converted signal strings outputted, for a purpose of interpolating the absolute angular position, from the light receiving unit at previous and current measurements within a set time shorter than an absolute angle calculation time required for a calculation of the absolute angular position; a correlation detection circuit which detects a correlation between the previous and current photoelectrically-converted signal strings stored in the photoelectrically-converted signal string storage to detect a shift amount therebetween; and an interpolation calculation circuit which interpolates an inter-pattern absolute angular position equivalent value based on a shift amount obtained at the current measurement, and the calculation circuit calculates a current absolute angular position by calculating an interpolated angle based on the shift amount and the absolute angular position equivalent value, and then by adding a calculated interpolated angle obtained at the current measurement to an absolute angular position obtained at the previous measurement.

Preferably, the calculation circuit binarizes the photoelectrically-converted signal strings by using a threshold value to detect the shift amount.

Preferably, the patterns include transmissive slits, and the light emitting and receiving units face each other with the rotary range of the transmissive slits interposed therebetween.

Preferably, the absolute angle calculation apparatus further comprises an amplifier circuit provided between the light receiving unit and the photoelectrically-converted signal string storage, and which amplifies the photoelectrically-converted signal strings.

Preferably, the photoelectrically-converted signal string storage comprises: a first storage circuit and a second storage circuit; and wherein the first storage circuit stores a photoelectrically-converted signal string which is obtained at the previous measurement, and the previous measurement is defined as a measurement at a set time just before current time, and the second storage circuit stores a photoelectrically-converted signal string which is obtained at the current measurement, and the current measurement is defined as a measurement at the current time.

Preferably, the absolute angle calculation apparatus further comprises a first switching device provided between the amplifier circuit and the photoelectrically-converted signal string storage, and which alternately switches a connection in regard to the amplifier circuit between the first storage circuit and the second storage circuit per predetermined time.

Preferably, the calculation circuit comprises a microcomputer, and a second switching device is provided between the microcomputer and the photoelectrically-converted signal string storage, and the second switching device, when the amplifier circuit and one of the first storage circuit and the second storage circuit are connected by the first switching device, connects the other of the first storage circuit and the second storage circuit to the microcomputer, and connects one of the first storage circuit and the second storage circuit to the microcomputer, when the amplifier circuit and the other of the first storage circuit and the second storage circuit are connected by the first switching device.

Preferably, the light emitting unit comprises a light emitting element and a collimator lens, and the light receiving unit comprises a linear sensor or a CCD (Charge-Coupled Device).

Preferably, the correlation detection circuit detects the shift amount by a correlation detection, by using a plurality of elements existing in a center part of all elements which comprise the linear sensor or the CCD, with an element in a center of the all elements being regarded as the center.

Preferably, the patterns comprise a plurality of patterns, a pitch width between each pattern is a fixed width, and widths of the patterns are modulated by a predetermined rule, and the interpolation calculation circuit calculates the absolute angular position equivalent value based on the pitch width between each pattern and the shift amount.

BRIEF DESCRIPTION OF THE DRAWINGS

FIGS. 2A to 2C are explanatory views illustrating an example of a rotary encoder incorporated in the rotary laser apparatus illustrated in FIG. 1.

DETAILED DESCRIPTION OF PREFERRED EMBODIMENT

A description is given of an embodiment of an absolute angle calculation apparatus according to the present invention below with reference to the drawings.

Figure 3:
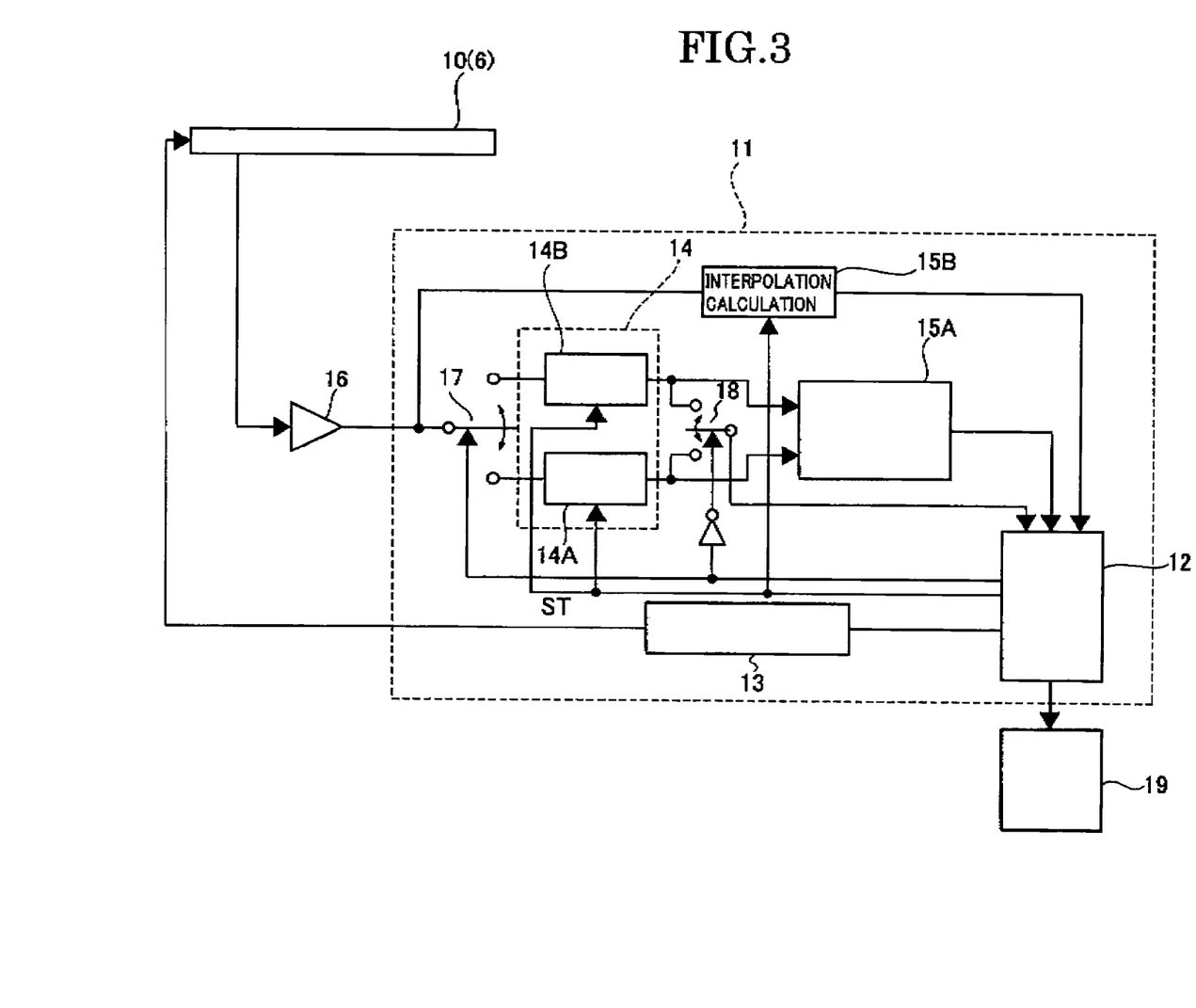
FIG. 3 is a block circuit diagram illustrating an example of an absolute angle calculation apparatus according to an embodiment of the present invention.

FIG. 3 is a block circuit diagram illustrating a configuration of a main portion of the absolute angle calculation apparatus according to the embodiment of the present invention. The configuration of a rotary encoder 3 is the same as that illustrated in FIG. 1, and a detailed description thereof is not illustrated.

In FIG. 3, reference numeral 10 denotes a linear sensor or a CCD comprising, for example, a large number of light receiving elements as a light receiving unit 6, and reference numeral 11 denotes a calculation circuit.

The calculation circuit 11 mainly includes a microcomputer 12, a clock driver 13, a photoelectrically-converted signal string storage 14, a correlation detection circuit 15A, and an interpolation calculation circuit 15B.

Figure 4:
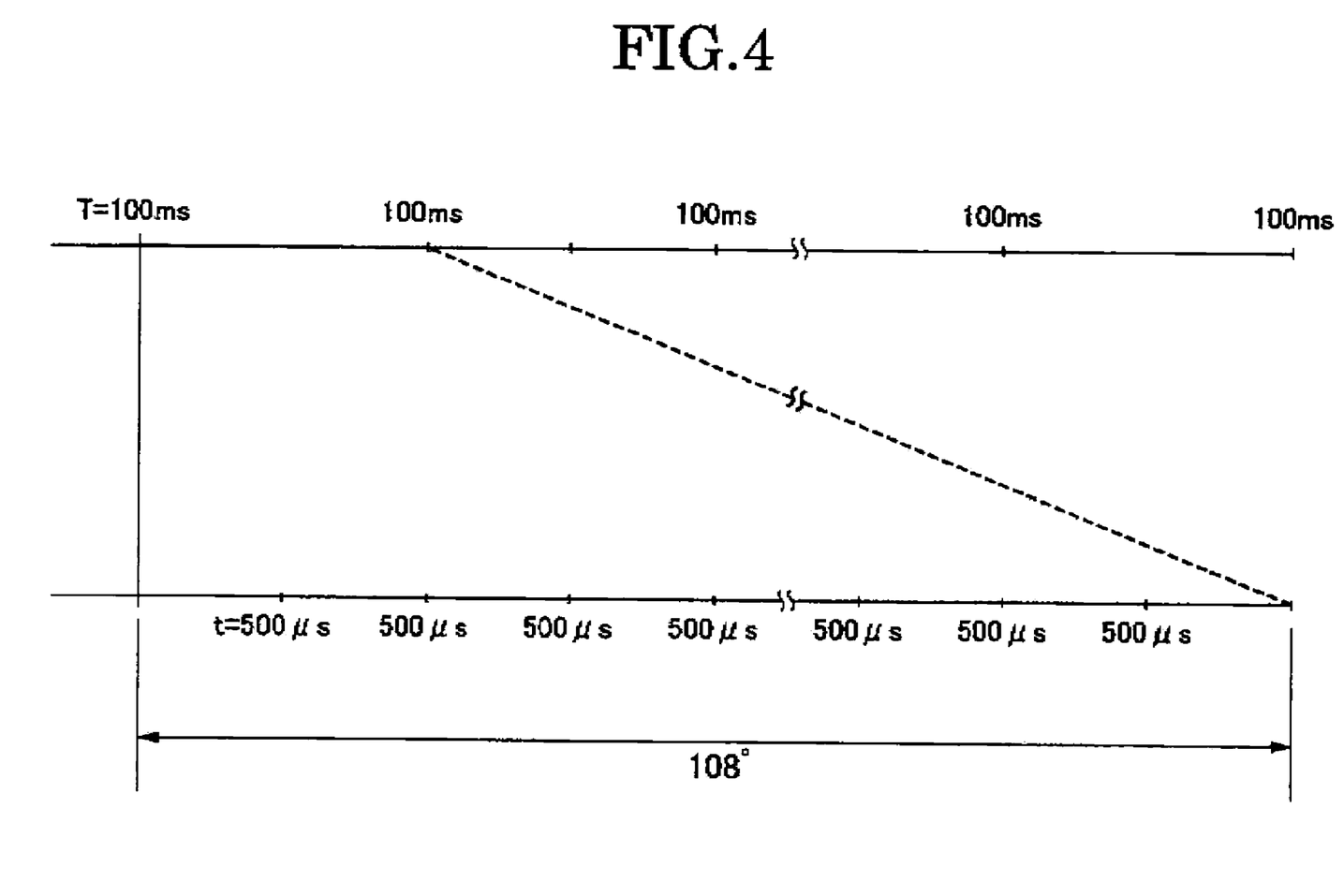
FIG. 4 is an explanatory view of an angle calculation time by the absolute angle calculation apparatus according to the embodiment of the present invention.

The microcomputer 12 has a function of setting a set time t shorter than an absolute angle calculation time T taken for calculation illustrated in FIG. 4 for purposes of interpolation of the absolute angular position θ obtained by calculation. For example, here, the absolute angle calculation time T is 100 milliseconds (ms), which corresponds to 108° (degrees) in angle. The set time t is 500 microseconds (μs), which corresponds to 0.54° in angle.

The microcomputer 12 outputs a control signal to the clock driver 13, and the clock driver 13 outputs a drive signal to the linear sensor 10.

The liner sensor 10 outputs a photoelectrically-converted signal string via an amplifier circuit 16 to the photoelectrically-converted signal string storage 14 on the basis of the drive signal from the clock driver 13. The number of elements of the linear sensor 10 is 512, for example. Here, a pitch width of one element is about 73 seconds in angle, and the angle of the linear sensor 10 is therefore 73×512 seconds, about 10.4°.

The photoelectrically-converted signal string storage 14 has a function of temporarily storing the photoelectrically-converted signal string outputted from each element of the linear sensor 10 during the set time t set by the microcomputer 12, including storage circuits 14A and 14B.

One of the storage circuits 14A and 14B functions as a previous string storage circuit storing the photoelectrically-converted signal string obtained at a previous measurement. Here, a measurement at the set time t just before current time is defined as the previous measurement, and a measurement at the current time is defined as a current measurement. The other one of the storage circuits 14A and 14B functions as a current string storage circuit storing the photoelectrically-converted signal string obtained at the current measurement.

The microcomputer 12 has a function of controlling switching devices 17 and 18. The switching device 17 switches every 500 μs between a state where the amplifier circuit 16 is connected to the storage circuit 14A and a state where the amplifier circuit 16 is connected to the storage circuit 14B.

The switching device 18 switches every 500 μs between a state where the microcomputer 12 is connected to the storage circuit 14A and a state where the microcomputer 12 is connected to the storage circuit 14B. In a state where the switching device 18 connects the storage 14A and microcomputer 12, the switching device 17 is switched to connect the amplifier circuit 16 and storage circuit 14B. In a state where the switching device 18 connects the storage 14B and microcomputer 12, the switching device 17 is switched to connect the amplifier circuit 16 and storage circuit 14A. The switching device 18 is used to input the photoelectrically-converted signal string, which is necessary for absolute angle calculation, to the microcomputer 12 every 100 ms.

Each of the storage circuits 14A and 14B has a function of temporarily storing the photoelectrically-converted signal string outputted from the 512 elements just before a time point of 500 μs as a reference. The microcomputer 12 is connected every 100 ms to the storage circuit 14A or 14B and calculates every absolute angle calculation time T the absolute angular position θ with respect to the reference angular position Q on the basis of a spatially modulated component in the 512 photoelectrically-converted signal strings stored in the storage circuit 14A or 14B. The microcomputer 12 outputs a result of a calculation to a display unit 19, and the display unit 19 displays the absolute angular position θ with respect to the reference angular position Q on a screen thereof.

Moreover, to detect a shift amount every set time t by a correlation method between the photoelectrically-converted signal string stored in the previous string storage circuit and the photoelectrically-converted signal string stored in the current storage circuit, the microcomputer 12 outputs a control timing signal ST and then the photoelectrically-converted signal strings stored in the storage circuits 14A and 14B are outputted to the correlation detection circuit 15A by the control timing signal ST.

Figure 5A:
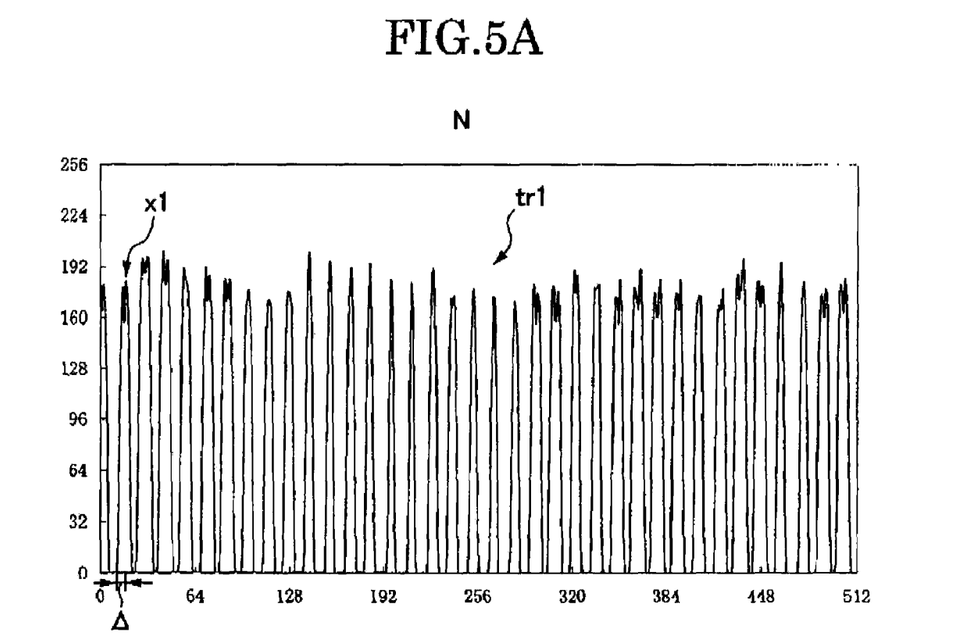
FIGS. 5A and 5B are explanatory views illustrating examples of photoelectrically-converted signal strings stored in the photoelectrically-converted signal string storage illustrated in FIG. 4, illustrating previous and current photoelectrically-converted signal strings, respectively.
Figure 5B:
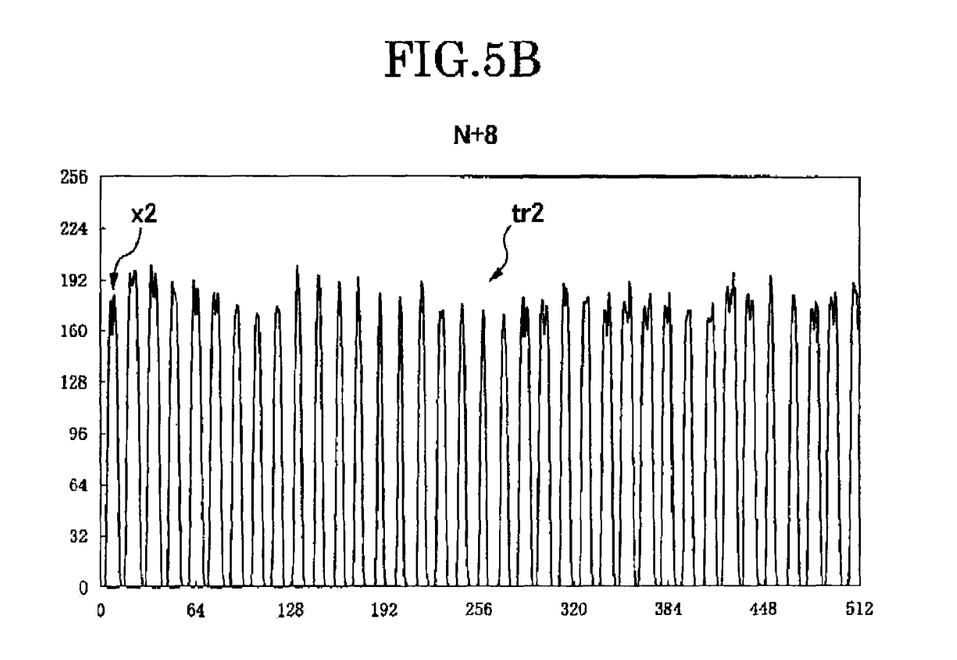

For example, the correlation detection circuit 15A compares each of 512 photoelectrically-converted signal strings tr1 stored in the storage circuit 14A (see FIG. 5A) and each photoelectrically-converted signal string tr2 stored in the storage circuit 14B (see FIG. 5B) according to the correlation method and detects a shift amount Δ. In FIGS. 5A and 5B, a photoelectrically-converted signal indicated by x1 in FIG. 5A corresponds to a photoelectrically-converted signal indicated by x2 in FIG. 5B and is illustrated as shifted from x2 by eight elements (pixels). Accordingly, the shift amount Δ is 8 here.

The shift amount Δ is inputted to the microcomputer 12. An interpolated value obtained by the interpolation calculation circuit 15B is also inputted to the microcomputer 12.

The interpolation calculation circuit 15B calculates an interpolated value (an absolute angle equivalent value) described below on the basis of the photoelectrically-converted signal string outputted from the amplifier circuit 16.

Figure 6:
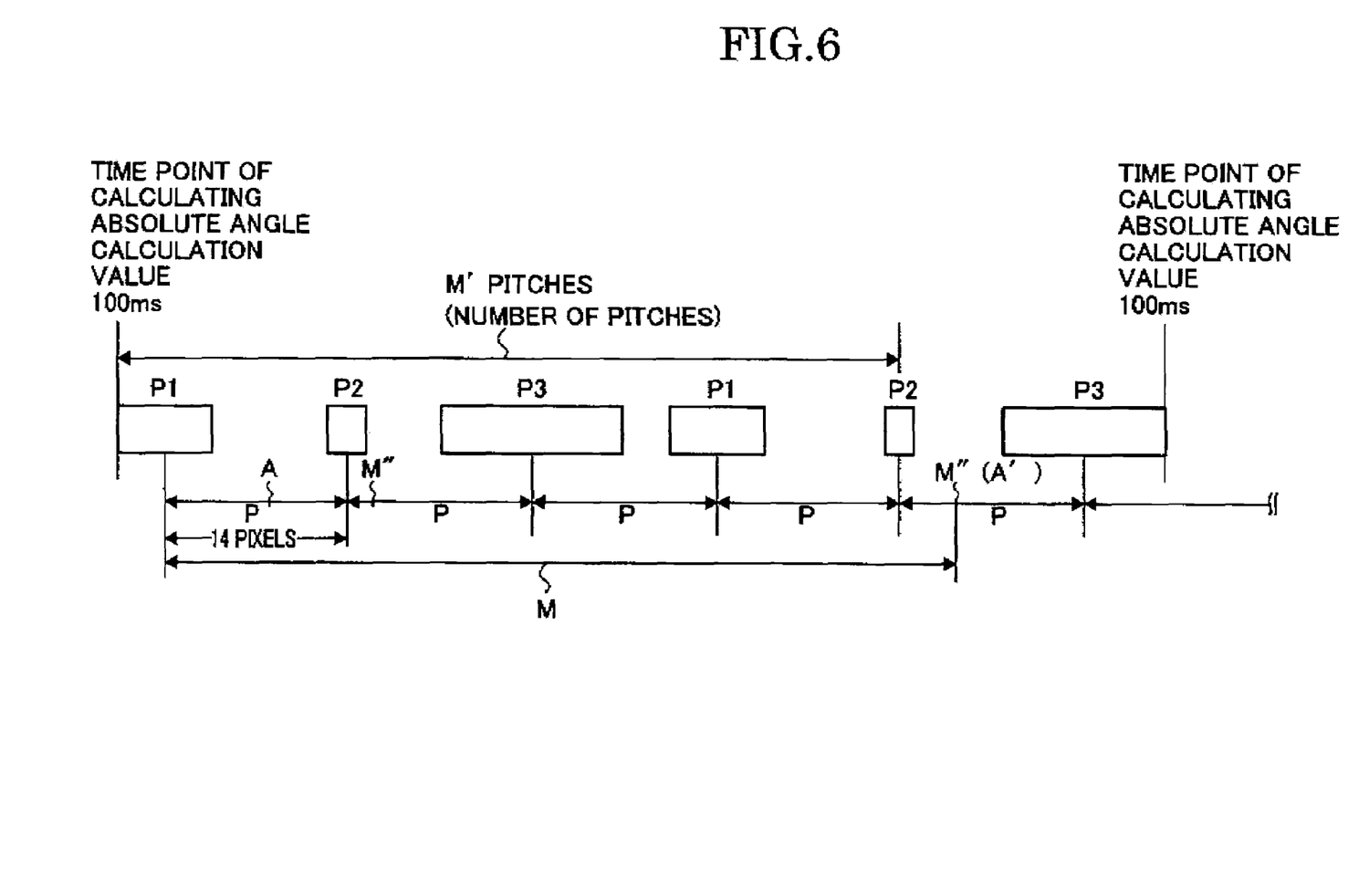
FIG. 6 is an explanatory view of interpolation calculation according to the embodiment of the present invention.

FIG. 6 is a schematic explanatory view of patterns for calculation of the interpolated value. FIG. 6 illustrates patterns crossing a center of the light receiving element 10 in the rotating direction from a time point when an absolute angle calculation value is calculated to a time point when a next absolute angle calculation value is calculated.

Here, each of pitch intervals P between each pattern is equal to 14 pixels, for example. Each of the pitch intervals P is 1029 seconds in angle (about 73 seconds×14 pixels=about 1022 seconds). Here, for example, the interpolation calculation circuit 15B calculates an interpolated value every 0.1 or 1 sec. For example, when the shift amount Δ is 8, an interpolated value A is equivalent to a value: (8/14)×1029 seconds. Moreover, when the shift amount Δ is 14 or more, a numeric value (number of the pixels) of the shift amount Δ is represented by reference symbol M, a numeric value (number of the pitches) of the M×73 seconds divided by 1029 is represented by reference symbol M', and reference symbol M" is a reminder thereof. This remainder M" is the number of the pixels between M' th pattern and (M'+1) th pattern inclusive, and indicates the number of the pixels counted from the M' th pattern. Accordingly, an interpolated value A' between the M' th pattern and the (M'+1) th pattern is calculated using following formula: A'=(M"/14)×73.

Accordingly, the interpolated value A from the time when the absolute angle is obtained is calculated using the following formulas:

$$A=(1029 \times M')+A'$$

that is, $$A=(1029 \times M')+(M''/14) \times 73$$

This incorporated value A is inputted to the microcomputer 12. The microcomputer 12 calculates an interpolated angle φ on the basis of the interpolated value A. The microcomputer 12 adds the interpolated angle φ obtained at the current measurement to the absolute angular position θ obtained at the previous measurement to calculate a current absolute angular position (θ+φ). In this example, the shift amount Δ is 8, and the interpolated angle φ is 588.8 seconds. In this example, the interpolated value A is calculated on the scale of 0.1 seconds.

Figure 7:
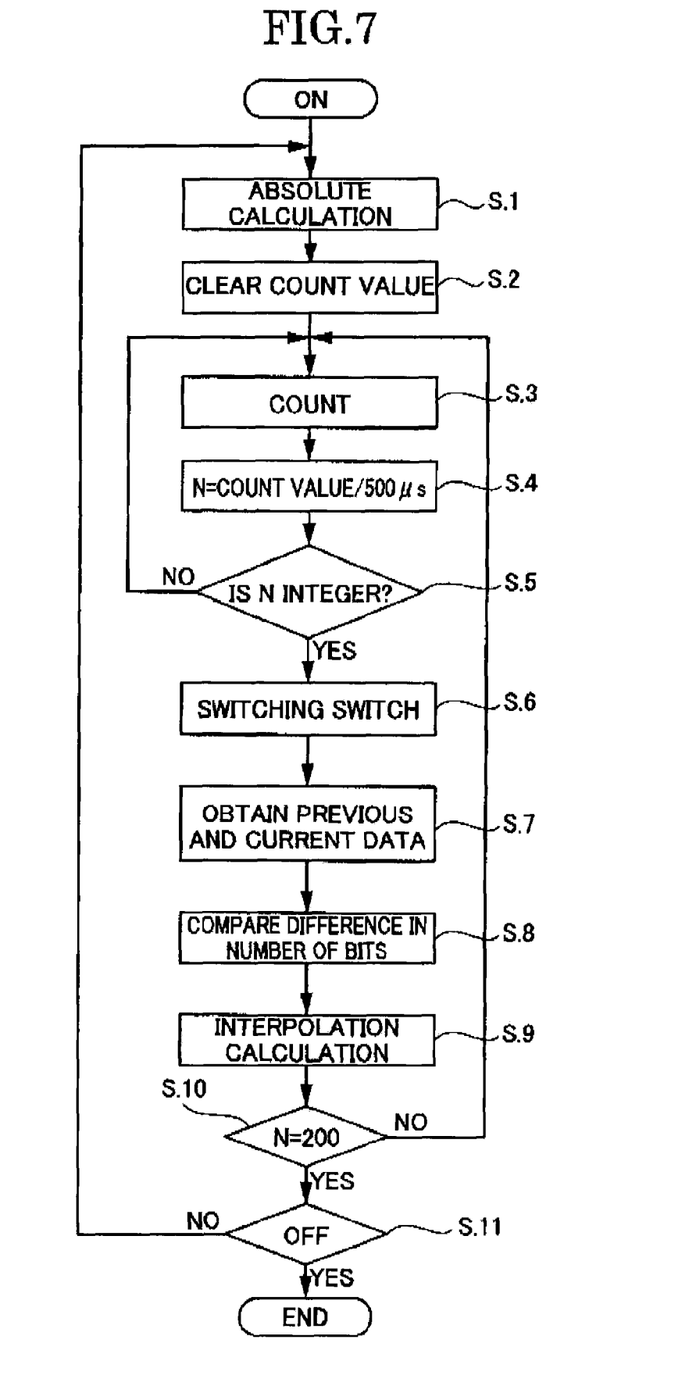
FIG. 7 is an example of a flowchart illustrating a process procedure of the absolute angle calculation apparatus according to the embodiment of the present invention.

A description is given of an example of an angle calculation flow of the absolute angle calculation apparatus below with reference to FIG. 7.

While the rotary encoder 3 is rotating, the microcomputer 12 executes an absolute calculation (absolute angular position calculation) every 100 ms, for example (this time can be arbitrarily set) (step S. 1). The microcomputer 12 then clears the count value (step S. 2) and starts to count (step S. 3). Subsequently, the microcomputer 12 divides the count value by, for example, 500 μs (this time can be arbitrarily set) (step S. 4) and judges whether a quotient N is an integer (step S. 5).

When the quotient N is not an integer, steps S. 3 to S. 5 are repeated. In step S. 5, when the quotient N is judged to be an integer, the microcomputer 12 outputs a switching signal to the switching device 17.

Just after the absolute calculation is executed, that is, when N=1, the switching device 17 is switched from a state where the amplifier circuit 16 is connected to the storage circuit 14A to a state where the amplifier circuit 16 is connected to the storage circuit 14B (step S. 6). The switching device 18 is switched to the storage circuit different from the storage circuit connected to the switching device 17.

The 512 photoelectrically-converted signals tr1 used in the absolute calculation are stored in the storage circuit 14A as a previous photoelectrically-converted signal string tr1. The storage circuit 14B stores a current photoelectrically-converted signal string tr2 (step S. 7).

Data of the previous photoelectrically-converted signal string tr1 and data of the current photoelectrically-converted signal string tr2 are inputted to the correlation detection circuit 15A, and the correlation detection circuit 15A detects the shift amount Δ by the correlation calculation on the basis of the photoelectrically-converted signal strings tr1 and tr2 (step S. 8).

The shift amount Δ is then inputted to the microcomputer 12. The microcomputer 12 calculates the interpolated angle φ on the basis of the shift amount Δ and interpolated value A, adds the interpolated angle φ obtained at the current measurement to a previous absolute angular position θ0 previously obtained, and obtains an absolute angular position θ1 (θ1=θ0+φ) (step S. 9).

Subsequently, the microcomputer 12 judges whether N is 200 (step S. 10). When N is not 200, the microcomputer 12 proceeds to step S. 3, continues to count, and again judges whether the quotient N is an integer (step S. 5). For example, when N=2, the microcomputer 12 executes the switching of the switching device 17.

The state where the amplifier circuit 16 is connected to the storage circuit 14B is switched to the state where the amplifier circuit 16 is connected to the storage circuit 14A, thereby. When N=2, the storage circuit 14B serves as a storage of data of the previous photoelectrically-converted signal string tr1, and the storage circuit 14A serves as a storage of data of the current photoelectrically-converted signal string tr2.

The data of the previous photoelectrically-converted signal string tr1 stored in the storage circuit 14B and data of the current photoelectrically-converted signal string tr2 stored in the storage circuit 14A are similarly inputted to the correlation detection circuit 15A, and the correlation detection circuit 15A detects the shift amount Δ by the correlation calculation based on these data. The shift amount Δ is inputted to the microcomputer 12. The microcomputer 12 calculates the interpolated angle φ on the basis of the shift amount Δ and interpolated value A, adds the interpolated angle φ obtained at the current measurement to the previous absolute angular position θ1 previously obtained, and obtains an absolute angular position θ2 (θ2=θ1+φ) (step S. 9).

The microcomputer 12 repeats the aforementioned process until N=200. Here, when the quotient N is an even number, the storage circuit 14A serves as a storage of data of the current photoelectrically-converted signal string, and the storage circuit 14B serves as a storage of data of the previous photoelectrically-converted signal string. When the quotient N is an odd number, the storage circuit 14A serves as a storage of data of the previous photoelectrically-converted signal string, and the storage circuit 14B serves as a storage of data of the current photoelectrically-converted signal string. Every 100 ms, the microcomputer 12 repeatedly calculates the absolute angular position a with respect to the reference angular position Q on the basis of the spatially modulated component in the photoelectrically-converted signal string stored in the storage circuit 14A or 14B.

Upon judging N=200, the microcomputer 12 proceeds to step S. 11 and judges whether the rotary encoder 3 is switched off. When the rotary encoder 3 is switched on, the microcomputer 12 proceeds to step S. 1 and continues processes of steps S. 1 to S. 11.

According to the rotary laser apparatus 1 using this absolute angle calculation apparatus, the absolute angular position θ with respect to the reference angular position Q when receiving the reflected light beam BP' from the target 2 is precisely obtained. Accordingly, when measuring a distance, it is obtained at what angle the rotary laser apparatus 1 should project a distance measuring laser beam with respect to the reference angular position Q. The distance to the target 2 is obtained even when the rotary laser apparatus 1 is unattended.

In this embodiment, the absolute angular position is obtained by interpolation of an absolute angular position using the 512 photoelectrically-converted signals obtained from the 512 elements. However, it is not necessary to use all of the 512 elements. For example, the interpolation of the absolute angular position by the correlation detection method may be performed using two 32 elements each starting in a different direction from a 256th element at the center of the 512 elements, that is, using 64 elements.

Even in a case of using 64 elements as described above, a shifted amount of a single element is 73 seconds in angle, and an angle of the 64 elements is 6072 sec. On the other hand, an angle that the rotary plate 4 rotates for 500 μs is about 0.54° (2016 seconds). Accordingly, variations in number of revolutions of the rotary plate 4 are considered not to affect the interpolation calculation.

Figure 8A:
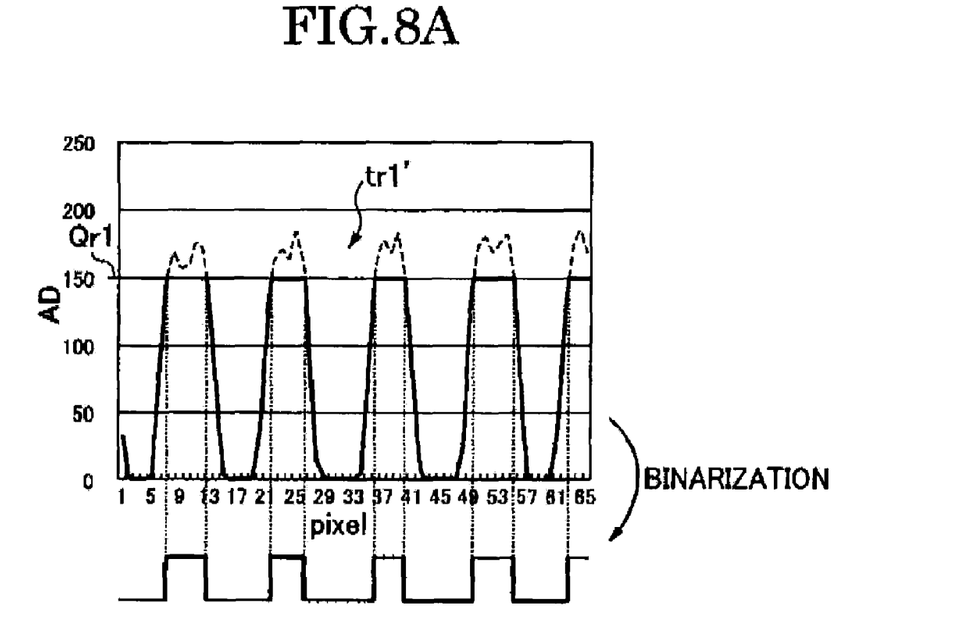
FIGS. 8A and 8B are explanatory views illustrating examples of binarized photoelectrically-converted signal strings, illustrating previous and current photoelectrically-converted signal strings, respectively.
Figure 8B:
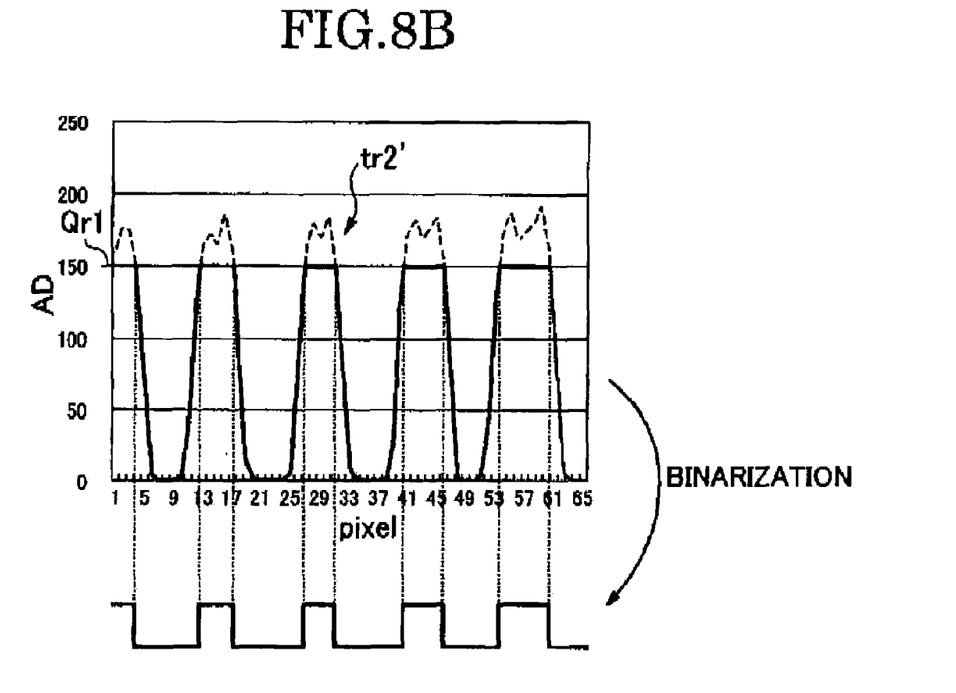

In this embodiment of the present invention, the correlation detection circuit 15A performs the correlation detection using the photoelectrically-converted signal strings tr1 and tr2, which are raw. However, as illustrated in FIGS. 8A and 8B, the shift amount Δ may be detected on the basis of photoelectrically-converted signal strings tr1' and tr2' which are obtained by binarizing 64 photoelectrically-converted signals using a threshold Qr.

The absolute angle calculation apparatus described above, attempts to reduce an angle calculation time and have an effect that makes it possible to precisely measure an absolute anglular position.

According to the absolute angle calculation apparatus described above, the shift amount is detected by a correlation detection, by using a plurality of elements existing in a center part of all elements which comprise the light receiving unit, with an element in a center of the all elements being regarded as the center, so that a reduction of an operating time is achieved.

Although the present invention has been described in terms of exemplary embodiments, it is nor limited thereto. It should be appreciated that variations may be made in the embodiments described by persons skilled in the art without departing from the scope of the present invention as defined by the following claims.

What is claimed is:

1. An absolute angle calculation apparatus, comprising:
a rotary plate having patterns spatially modulated;
a light emitting unit facing a rotary range of the patterns;
a light receiving unit which receives a light beam obtained from the light emitting unit through the patterns and converts the light beam to photoelectrically-converted signal strings; and
a calculation circuit which calculates an absolute angular position with respect to a reference angular position on the basis of a spatially modulated component contained in the photoelectrically-converted signal string outputted from the light receiving unit,
the calculation circuit including:
a photoelectrically-converted signal string storage which stores previous and current photoelectrically-converted signal strings outputted, for a purpose of interpolating the absolute angular position, from the light receiving unit at previous and current measurements within a set time shorter than an absolute angle calculation time required for a calculation of the absolute angular position;
a correlation detection circuit which detects a correlation between the previous and current photoelectrically-converted signal strings stored in the photoelectrically-converted signal string storage to detect a shift amount therebetween; and
an interpolation calculation circuit which interpolates an inter-pattern absolute angular position equivalent value based on a shift amount obtained at the current measurement, and
the calculation circuit calculating a current absolute angular position by calculating an interpolated angle based on the shift amount and the absolute angular position equivalent value, and then by adding a calculated interpolated angle obtained at the current measurement to an absolute angular position obtained at the previous measurement.

2. The absolute angle calculation apparatus according to claim 1, wherein the calculation circuit binarizes the photoelectrically-converted signal strings by using a threshold value to detect the shift amount.

3. The absolute angle calculation apparatus according to claim 1, wherein the patterns include transmissive slits, and the light emitting and receiving units face each other with the rotary range of the transmissive slits interposed therebetween.

4. The absolute angle calculation apparatus according to claim 1, further comprising an amplifier circuit provided between the light receiving unit and the photoelectrically-converted signal string storage, and which amplifies the photoelectrically-converted signal strings.

5. The absolute angle calculation apparatus according to claim 4, wherein the photoelectrically-converted signal string storage comprises: a first storage circuit and a second storage circuit; and wherein the first storage circuit stores a photoelectrically-converted signal string which is obtained at the previous measurement, and the previous measurement is defined as a measurement at a set time just before current time, and the second storage circuit stores a photoelectrically-converted signal string which is obtained at the current measurement, and the current measurement is defined as a measurement at the current time.

6. The absolute angle calculation apparatus according to claim 5, further comprising a first switching device provided between the amplifier circuit and the photoelectrically-converted signal string storage, and which alternately switches a connection in regard to the amplifier circuit between the first storage circuit and the second storage circuit per predetermined time.

7. The absolute angle calculation apparatus according to claim 6, wherein the calculation circuit comprises a microcomputer, and a second switching device is provided between the microcomputer and the photoelectrically-converted signal string storage, and the second switching device, when the amplifier circuit and one of the first storage circuit and the second storage circuit are connected by the first switching device, connects the other of the first storage circuit and the second storage circuit to the microcomputer, and connects one of the first storage circuit and the second storage circuit to the microcomputer, when the amplifier circuit and the other of the first storage circuit and the second storage circuit are connected by the first switching device.

8. The absolute angle calculation apparatus according to claim 3, wherein the light emitting unit comprises a light emitting element and a collimator lens, and the light receiving unit comprises a linear sensor or a CCD (Charge-Coupled Device).

9. The absolute angle calculation apparatus according to claim 8, wherein the correlation detection circuit detects the shift amount by a correlation detection, by using a plurality of elements existing in a center part of all elements which comprise the linear sensor or the CCD, with an element in a center of the all elements being regarded as the center.

10. The absolute angle calculation apparatus according to claim 8, wherein the patterns comprise a plurality of patterns, a pitch width between each pattern is a fixed width, and widths of the patterns are modulated by a predetermined rule, and the interpolation calculation circuit calculates the absolute angular position equivalent value based on the pitch width between each pattern and the shift amount.

* * * * *